United States Patent

[11] 3,554,498

| | | |
|---|---|---|
| [72] | Inventor | Geoffrey Laycock |
| | | Darlington, England |
| [21] | Appl. No. | 702,850 |
| [22] | Filed | Feb. 5, 1968 |
| [45] | Patented | Jan. 12, 1971 |
| [73] | Assignee | Underground Mining Machinery Limited |
| | | London, England |
| | | a British company |
| [32] | Priority | Feb. 3, 1967 |
| [33] | | Great Britain |
| [31] | | No. 5,249/67 |

[54] PROCESS FOR THE PRODUCTION OF AGGREGATE COATED WITH BITUMINOUS MATERIAL
3 Claims, 2 Drawing Figs.

[52] U.S. Cl. .................................................. 259/159, 259/164
[51] Int. Cl. .................................................. B28c 1/22
[50] Field of Search .................................................. 259/153, 154, 155, 156, 157, 158, 159, 161, 162, 163, 167, 172, 175, 176, 177

[56] References Cited
UNITED STATES PATENTS

| 1,058,342 | 4/1913 | Richards ...................... | 259/156 |
| 2,179,104 | 11/1939 | Rybeck ........................ | 259/172 |
| 2,945,683 | 7/1960 | Martinson .................... | 259/155X |

Primary Examiner—Robert W. Jenkins
Attorney—Sughrue, Rothwell, Mion, Zinn & MacPeak ABSTRACT: A process and apparatus are provided for the production of aggregate coated with bituminous material, including tarmacadam, bitumen macadam, fine cold asphalt and hot rolled asphalt. The process involves check weighing a batch of aggregate passing it into a rotary batch heater, where the aggregate is heated to the desired temperature which the batch is being heated the exhaust gases produced by the heater carry smaller particles of aggregate out of the heater and these are collected in a multitubular cyclone-type collector. When the batch in the heater reaches the desired temperature it is fed to a mixer along with the appropriate quantity of heated bitumen and the particle collector is arranged to automatically feed the small particles collected from the batch during the heating step into the mixer. This ensures that the resultant mix does not vary from specification.

PROCESS FOR THE PRODUCTION OF AGGREGATE COATED WITH BITUMINOUS MATERIAL

BACKGROUND TO THE INVENTION

This invention relates to a process for the production of aggregate coated with bituminous material. Such coated aggregate is normally referred to for example, as of tarmacadam, bitumen macadam, fine cold asphalt and hot rolled asphalt, depending on the particle size of the aggregate and the nature of the bituminous material used to coat the aggregate and bond the particles together. The invention also provides an apparatus which is particularly suitable for carrying out the process.

In the production of the materials referred to above for use in the construction of tarmacadam or asphalt road surfaces it is important that the amount of differently sized material in the batch of aggregate should be accurately measured. In the case of hot rolled asphalt and mixtures requiring high temperatures and containing a large proportion of fine material, this is normally done by roughly proportioning the material in their single sizes and feeding the proportioned material continuously into a conventional rotary heater, where the material is dried and heated to the required temperature before being elevated and passed over a screen for further separation. The resulting hot material in its single sizes passes into hot storage bins from where it is drawn off in exact quantities to form a batch of the desired constitution which is then suitable for feeding into a batch mixer where the bituminous binder material other additives are fed and where the mixer then produces the complete batch of material. In this process the finer materials are extracted from the roughly proportioned aggregate during the heating in the rotary heater with the exhaust gases and the fine material is subsequently collected in suitable dust collection equipment. The collected dust can then either be fed to the aggregate prior to the screening step so that it will eventually pass into the hot bin holding the smaller sizes of material, or alternatively, the minus 200 mesh dust can be weighed separately in a proportion relative to the batch being produced and can be fed to the mixer as a filler. It is possible that both of the above measures can be taken if the collected dust from the rotary dryer is separated at the collector into approximately minus 200 mesh and plus 200 mesh fractions. In considering the dust which is fed back into the hot aggregate for rescreening and use, it is however difficult to assess exactly how much dust as compared with slightly larger material is passing into the appropriate bin and hence the composition of the fine material is not known exactly.

The above-described process suffers from the disadvantages that it is complex and involves accurately weighing out hot materials.

In the a case of lower temperature tarmacadam and asphalt materials, a much simpler process may be adopted which does not suffer from the above disadvantages because the aggregate contains only a small amount of fines. In this process aggregates are proportioned accurately either by weight or by volume to form a batch of material of the size capable of being handled by a batch mixer at the end of the process. This batch of material passes into a hopper where the weight is checked to be accurate within the limits set down in the relevant British Standards Specification. This batch then passes into a rotary batch heater where the materials is heated to the required temperature. Because there is normally only a small proportion of fines in the batch, the exhaust gases from the heater extract only a small proportion of the fines and the quantity extracted is insufficient to modify the batch weight at the end of the heating process when the batch is delivered into the mixer. These exhaust gases carrying the relatively small amount of fine material from the batch heater are normally collected in an external dust plant. The collected dust can then either be discharged to waste or alternatively can be fed to the mixer in the form of filler in the quantity required to comply with the British Standards Specification for the particular material being produced.

Both in the higher temperature materials described in the first process and the lower temperature materials described in the second process a certain amount of filler is normally required to complete the batch weight. This filler requirement, being necessary for both processes, may be disregarded for the purposes of considering the present invention.

SUMMARY OF THE INVENTION

It is the object of the present invention to provide a process which does not suffer from the disadvantages of the first process described above and which will enable all macadam and asphalt materials to be produced in one type of plant whatever the particle size constitution of the aggregate.

According to the present invention there is provided a process for the production of aggregate coated with bituminous material which process comprises feeding a batch of correctly proportioned aggregate to a rotary batch heater, heating the aggregate to the appropriate temperature in the heater, collecting a major proportion of the small particles of material carried out of the heater during the heating of the batch and adding the collected material to a mixer together with the heated aggregate and the appropriate quantity of heated bituminous binder material.

The invention also provides apparatus for carrying out the process described above which comprises a rotary batch heater whose outlet communicates with a particle collector, a mixer for receiving a batch of heater aggregate and bituminous binder material, means for feeding a batch of aggregate to the heater, means for feeding the batch of aggregate to the mixer after heating and means for feeding the particles collected from each batch to the mixer.

The means for feeding the batch of aggregate to the heater and to the mixer after heating may comprise a chute pivotably mounted at a point close to the outlet from the batch heater. In one position the chute can be arranged to guide material into the rotary batch heater and in its second position for guiding material out of the batch heater into the mixer.

Preferably the particle collector takes the form of a casing containing a bank of cyclones. Each cyclone comprises a tube which is open at both ends and uniform in diameter for a substantial part of its length but tapers towards the bottom. A series of holes are formed in the walls of the tubes and when a stream of air bearing small particles is directed transversely onto the tubes, the air passes through the holes and creates a vortex in the tubes. As a result small particles of material carried in the stream of air are collected and fall from the a tapering ends of the tube.

The air emitted from the particle collector will normally contain a small amount of dust and this may be collected in a secondary collector. It is possible to return this fine dust to the mixer as a correctly weighed quantity in accordance with the filler requirements of the British Standard Specification of the particular coated aggregate being produced.

One embodiment of the apparatus in accordance with the invention will be described now with reference to the accompanying drawings in which.

Figure 1:
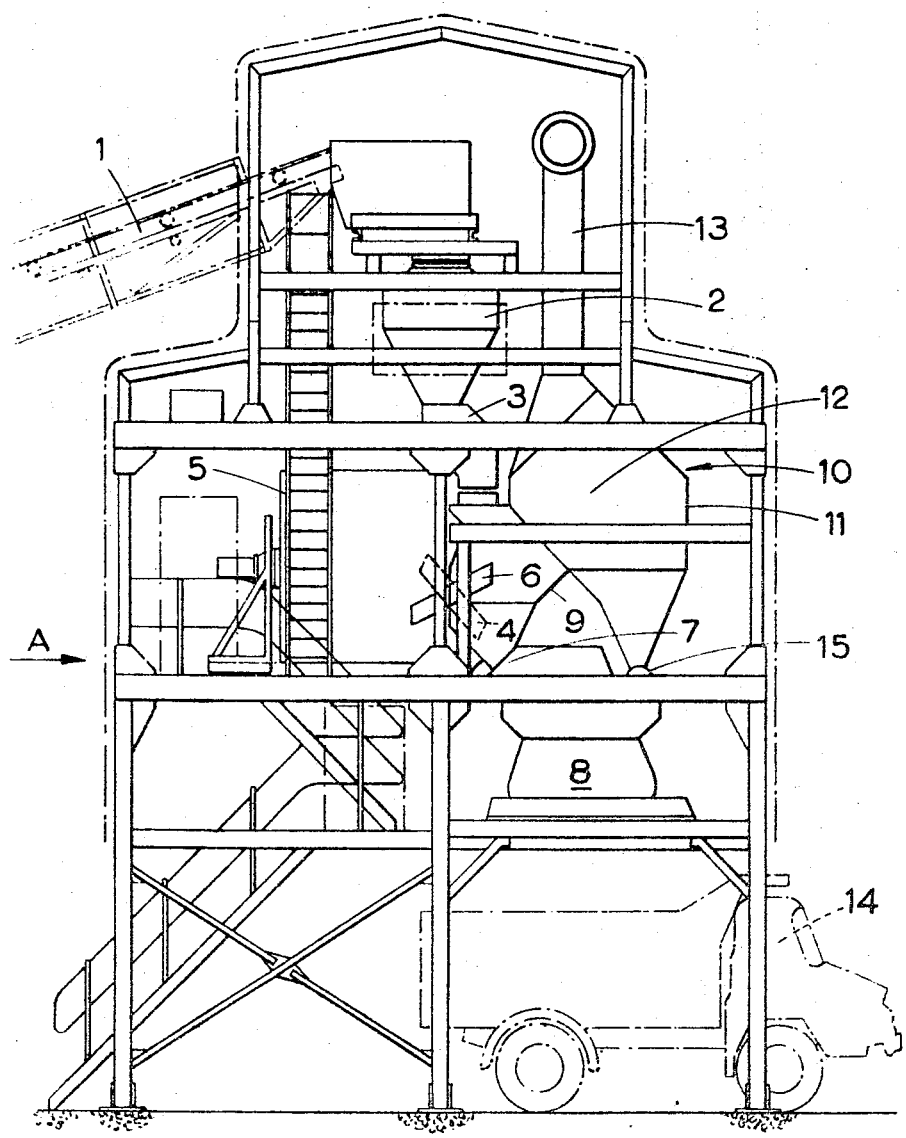
FIG. 1 is a sectional elevation of the apparatus.
Figure 2:
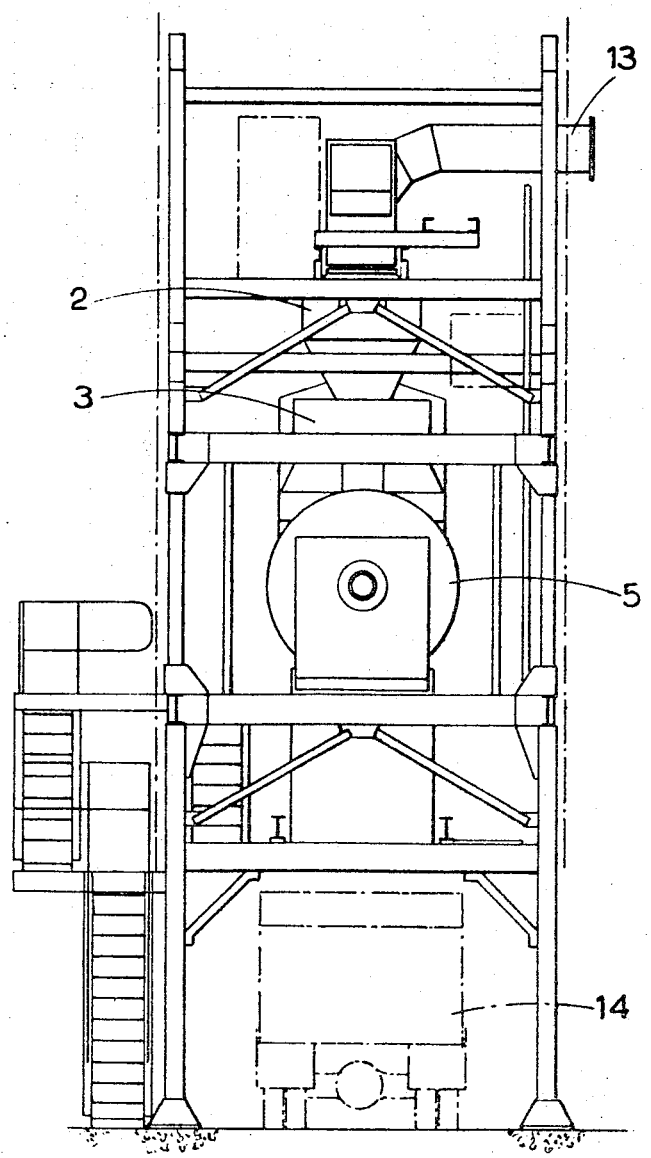
FIG. 2 is an end elevation taken in the direction of the arrow A in FIG. 1.

Referring to the drawings the apparatus comprises a girderwork structure in which the various components are mounted at different levels. Aggregate material is transported in batches to the apparatus by means of a conveyor 1 from a point (not shown) where the aggregate is weighed continuously into batches of accurately proportioned material. The correctly proportioned aggregate is fed to a hopper 2 in which batches of aggregate are check weighed and then fed via a duct 3 and a chute 4 to a rotary batch heater. The rotary batch heater 5 is oil fired and draws air through its burner and through the aggregate and is discharged out of the heater in the direction shown by the arrows. The chute 4 is pivotable about an axis 6 and can be pivoted about axis 6 into the position shown in dotted lines. In the position shown in dotted lines, the chute 4 conducts aggregate from the heater to a mixer 8 disposed below via a stationary chute 7. The mixer 8 is also connected to conventional equipment (not shown) for supplying a measured quantity of heated bituminous binder material.

As shown, the outlet from the batch heater 5 communicates with an upwardly sloping casing 9 which leads to a particle collector. The particle collector comprises a casing 11 in which are mounted a bank of cyclones 12. The casing 11 tapers downwardly to a valve 15 communicating with the mixer 8. The upper end of the casing 11 is connected to trunking 13 which communicates with a secondary dust collector (not shown).

In use the correctly proportioned aggregate is passed up the conveyor 1 and to the batch check weighing hopper 2. The hopper 2 check weighs the aggregate and as required batches are released along conduit 3 via chute 4 and into the rotary batch heater 5. The batch heater 5 is operated until the aggregate reaches the desired temperature and this may be done by either timing the heater or measuring the temperature directly. Where the temperature of the batch is measured, the temperature sensing device may be arranged to initiate the discharge of material from the heater when the batch has reached the desired temperature. After the batch has reached the desired temperature the chute 4 is swiveled into the position shown in dotted lines and while rotating the heater the aggregate is fed into the mixer 8 via stationary chute 7. During the heating stage some of the larger particles blown out of the heater are collected on the sloping casing 9 and guided into the mixer via the stationary chute 7. Smaller particles are collected in the casing 11 and these are added to the mixer by operating the valve 15 when feeding the heated batch of aggregate in the mixer. The secondary particle collectors may include means for automatically weighing the collected particles into the mixer. The correct quantity of heated bituminous binder material, together with any filler required, is then added to the mixer and, after mixing, the contents of the mixer may be emptied into a vehicle 14 in the loading position underneath the mixer.

In practice the apparatus is made in prefabricated sections so that it can be readily assembled on the site where the apparatus is to be used.

The apparatus of the present invention may be used in conjunction with the apparatus described in our copending British Pat. application No. 43596/66, the proportioned aggregate being fed from our previously described apparatus to the apparatus of the present invention via the conveyor 1 shown in the accompanying drawings.

I claim:

1. Apparatus for the production of aggregate coated with bituminous material which comprises a rotary batch heater for heating a correctly proportioned batch of aggregate, said heater having an outlet which communicates with a particle collector, a mixer for mixing heated aggregate and bituminous material, means for feeding particles collected from said batch to the mixer and means for feeding the batch of aggregate to the heater and to the mixer which comprises a chute pivotably mounted at a point close to the outlet from the batch heater, whereby in one position the chute is arranged to guide material into the rotary batch heater and in its second position is arranged to guide material out of the batch heater into the mixer.

2. Apparatus for the production of aggregate coated with bituminous material which comprises a rotary batch heater for heating a correctly proportioned batch of aggregate, said heater having an outlet which communicates with a particle collector, a mixer for receiving the batch of heated aggregate and bituminous material, means for feeding the batch of aggregate to the mixer after heating and means for feeding the particles collected from the batch to the mixer, said particle collector comprising at least one cyclone comprising a tube which is open at both ends and is uniform in diameter for a substantial part of its length but tapers towards its lower end, a series of holes being formed in the wall of said tube, whereby in use a stream of air is directed transversely into the tube and passes through the holes thereby creating a vortex in the tube and small particles of material carried in the stream of air are collected and fall from the tapering end of the tube.

3. Apparatus according to claim 2 in which a secondary collector is provided to collect fine dust carried in the stream of air from the cyclone.